United States Patent [19]
Wilt

[11] 3,874,593
[45] Apr. 1, 1975

[54] SPRAY SUPPORT FRAME

[76] Inventor: Theodore G. Wilt, c/o T. G. Wilt Farmy Employment, Box 397, Shelbina, Mo. 63468

[22] Filed: Oct. 23, 1973

[21] Appl. No.: 408,438

[52] U.S. Cl. ............... 239/166, 239/169, 239/172, 239/588, 111/6, 222/176, 47/1.7
[51] Int. Cl. .................... B05b 1/20, B05b 13/02
[58] Field of Search ........... 239/159, 161, 162, 163, 239/164, 166, 169, 172, 175, 176, 587, 588; 111/6, 7.2, 7.4, 7.1; 222/176; 47/1.7

[56] References Cited
UNITED STATES PATENTS

| | | | |
|---|---|---|---|
| 2,574,206 | 11/1951 | Browning | 239/162 X |
| 3,186,719 | 6/1965 | Sosalla et al. | 222/176 X |
| 3,515,349 | 6/1970 | Mecklin et al. | 239/169 |
| 3,522,910 | 8/1970 | Pfeiffer et al. | 239/163 |
| 3,625,428 | 12/1971 | Mecklin | 239/166 |

Primary Examiner—Robert S. Ward, Jr.
Attorney, Agent, or Firm—Fishburn, Gold & Litman

[57] ABSTRACT

A spray support frame for use with an earth working apparatus, such as a planter, disc, or the like, which includes a mobile frame drawn by a tractor or the like and a container which is adapted to contain spray material and suitably carried on the frame or tractor and a duct connecting same to a spray nozzle. The spray support frame includes a pair of opposed rails each positioned and maintained in clamping engagement with a respective opposite side of a support member mounted on the mobile frame. The support frame including an arm having the spray nozzle mounted on one end thereof, said arm being pivotally mounted on one of the rails and engaged with the other rail to maintain the arm in a selected position to thereby position the spray nozzle at a selected position relative to the ground surface.

6 Claims, 4 Drawing Figures

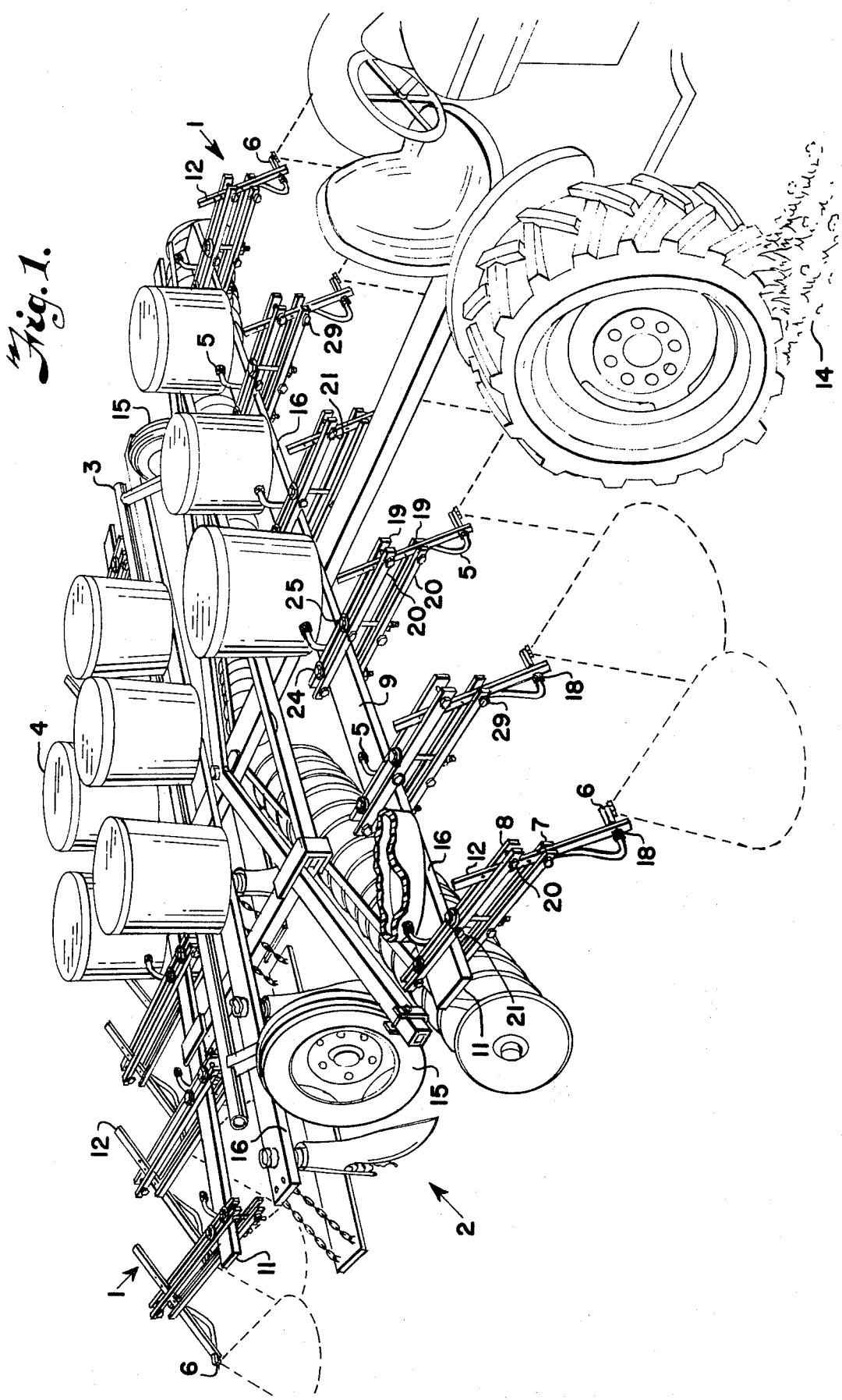

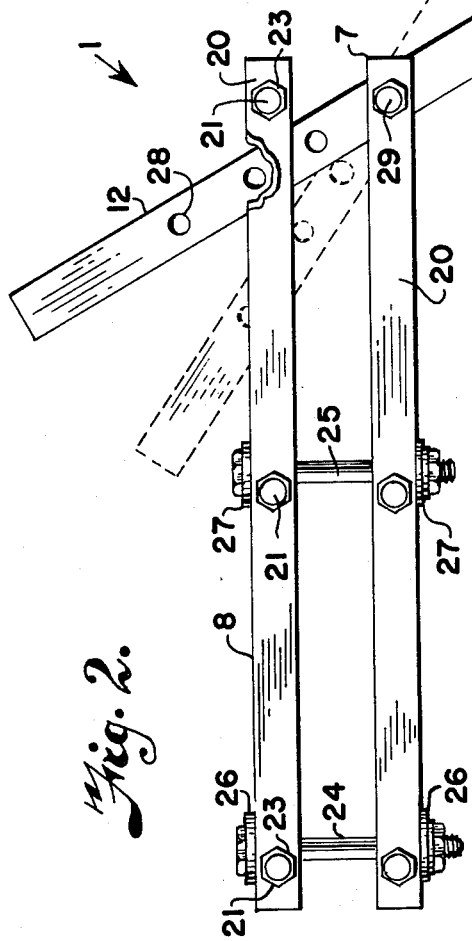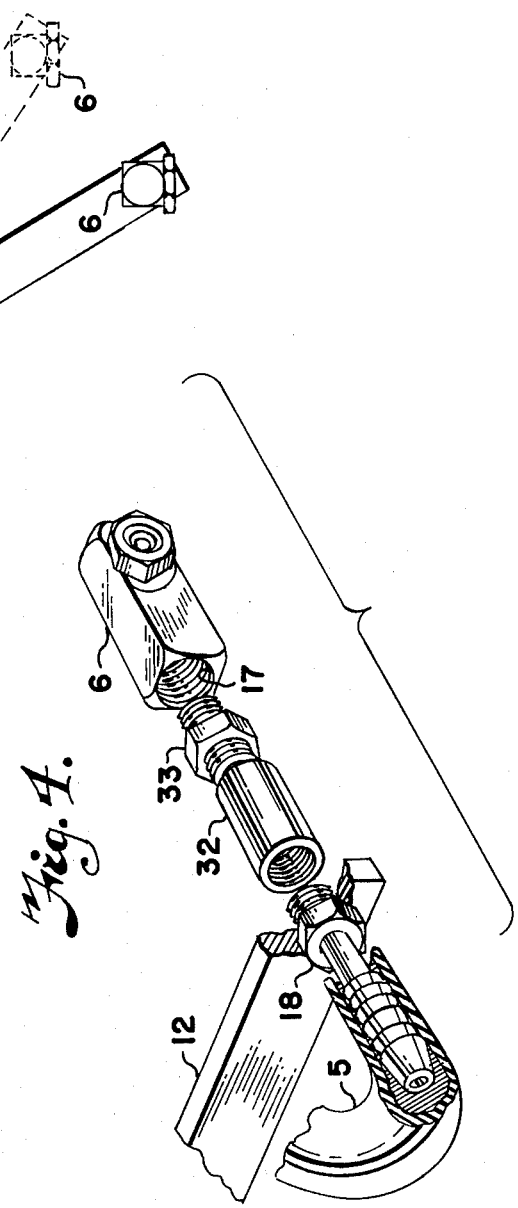

SPRAY SUPPORT FRAME

The present invention relates to agriculture apparatus, such as tilling, planting, and other apparatus and more particularly to a spray support frame for selectively positioning a spray nozzle relative to a ground surface.

Heretofore, various arrangements have been made for spraying liquids on land being farmed for preemergence protection against weeds and for desired treatment of the land and plants. The usual spray devices have included elongate pipes extending transversely of the path of travel and having a plurality of spaced spray nozzles or orifices along the pipe. The nozzles usually have a desire included angle of the spray and with such spray bars it is difficult to obtain desired spray angles and spacing of the pipe from all of the area being transversed for a uniform quantity of liquid or spray on the ground and minimum drift.

The principle objects of the present invention are: to provide a spray apparatus to overcome its difficulties of prior devices; to provide a spray support frame for use with an earth working apparatus such as a planter, disc, or the like; to provide such a spray support frame which permits easy adjustment of the position of a spray nozzle relative to a ground surface; to provide such a spray support frame which is constructed of a minimum of parts and which can be quickly assembled, adjusted, and disassembled; to provide such a spray support frame which is formed of light, simple, and inexpensive members; to provide such a spray support frame having components adopted to form a rigid frame which is in clamped engagement with a support member such as a beam or frame member of a mobile frame of an earth working apparatus; and to provide such a spray support frame which is stable and durable in use and which is particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include an exemplary embodiment of the present invention and illustrate various objects and features of the spray support frame for use with earth working apparatus.

FIG. 1 is a perspective view of an earth working apparatus having mounted thereon a spray support frame embodying features of the present invention.

FIG. 2 is an enlarged side elevational view of the spray support frame with alternate positions of a spray nozzle shown in broken lines.

FIG. 3 is an enlarged and elevational view of the spray support frame.

FIG. 4 is an enlarged exploded fragmentary perspective view of a modified mounting of a spray nozzle on the spray support frame.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a spray support frame for use with an earth working apparatus 2, such as a planter, disc, or the like, which includes a mobile frame 3. A container 4 adapted to contain suitable spray material may be carried on a draft vehicle such as a tractor or on the mobile frame 3 as described. A duct or other flow member 5 connects the container 4 to a spray nozzle 6. The spray support frame 1 includes a structure that is adjustable to accommodate different mounting members and has an arrangement to clamp same to secure the spray apparatus at selected positions. In the illustrated structure a pair of opposed rails 7 and 8 are positioned and adjustably maintained in engagement with opposite sides or surfaces 9 and 10 respectively of a support member 11 which may be a beam which is a part of the mobile frame 3 or mounted thereon. The spray support frame 1 includes an arm 12 which has the spray nozzle 6 mounted on a free end thereof and the arm 12 is pivotally mounted on one of the rails, for example 7, and the arm 12 is maintained in a selected position by suitable frictional engagement to thereby position the spray nozzle 6 at a selected position relative to a ground surface 14 over which the mobile frame 3 is moved.

The mobile frame 3 may be self propelled or adapted to be connected to and moved by a suitable prime mover, such as a tractor (not shown). The mobile frame 3 is shown as having the container 4 supported thereon and having mounted thereon suitable earth working means for working the ground surface 14 over which the mobile frame 3 travels. The mobile frame 3 may be formed in any desired shape, such as generally square, rectangular, triangular or the like with suitable members secured together to form a substantially rigid frame movable over the ground surface 14 and providing support for soil cultivating and planting elements and for the support member 11 having a spray support frame or frames mounted thereon. The mobile frame 3 preferably has at least one pair of spaced ground engaging wheels 15 for supporting the mobile frame 3 during movement over the ground surface 14.

The earth working apparatus 2 may include suitable furrow opening devices, such as plows or listers and seed furrow making devices associated with row planting elements and suitable shoes or shovels to open a fertilizer trench. The earth working apparatus 2 may include suitable seed shoes for placing the seed in the soil with the seed shoes being placed adjacent a rear portion of the mobile frame 3.

The illustrated support member 11 is mounted on the mobile frame 3 and may be any suitable rigid structural member, such as bars, H-beams, I-beams, channels, or the like having sides 16. The support member 11 is illustrated as positioned to extend transverse to the direction of movement of the mobile frame 3 however it may be a frame member and the spray nozzles may be in a transverse line, or at an angle to the direction of travel or staggered as desired. The container 4 is adapted to contain suitable spray material, such as preemergence weed spray, planting water, liquid fertilizer, or the like.

The duct or flow member 5 may be suitable tubing connected to the container 4 and to the spray nozzle 6. The duct or flow member 5 preferably includes a flexible portion adjacent the spray nozzle 6 to permit adjustment of the spray nozzle 6 relative to the ground surface 14, as by raising and lowering the spray nozzle 6.

The spray nozzle 6 may be any suitable spray nozzle preferably having an internally threaded bore 17 adapted to receive an externally threaded hose connection 18. The spray nozzle 6 may have a swirl chamber adapted to create a substantially uniform hollow cone pattern with 120° whereby the height of the spray nozzle 6 above the ground determines the area covered by the spray material.

The spray support frame 1 is adjustably mounted on the support member 11 and may be moved longitudinally thereof to a selected position having the spray nozzle 6 at a desired location relative to the ground surface 14. The opposed rails 7 and 8 of the spray support frame 6 are each positioned in engagement with a respective one of the opposite surfaces or sides 9 and 10 of the support member 11 for maintaining the support frame 1 in the selected position.

The rails 7 and 8 are each spaced elongated side-by-side members 19 and 20 and suitable fastening means, such as bolts 21 each having a head 22 in engagement with the exterior of one of the side-by-side members, such as the member 19, and a nut 23 in engagement with the exterior of the other member 20. The side-by-side members 19 and 20 of each of the rails 7 and 8 have facing generally flat surfaces.

The bolts 21 each extend through the side-by-side members 19 and 20 and are spaced along each of the rails 7 and 8 and are adapted to draw the respective side-by-side members 19 and 20 toward each other and into clamping engagement with first and second fastening members 24 and 25, as later described, and to draw the side-by-side members 19 and 20 of at least one of the rails 7 and 8 into frictional engagement with the arm 12 to thereby retain the arm 12 and the spray nozzle 6 thereon in a selected position relative to the ground surface 14.

The spray support frame 1 includes means for moving the rails 7 and 8 into and for maintaining the rails 7 and 8 in clamped engagement with the respective opposite surfaces or sides 9 and 10 of the support member 11 and in the illustrated structure, spaced fastening members 24 and 25 are each positioned between the side-by-side members 19 and 20 of each of the rails 7 and 8. The fastening members 24 and 25 each preferably have suitable washers 26 and 27 engageable with opposite edges of the rails 7 and 8. The fastening members 24 and 25 are adapted to effect clamping engagement of the rails 7 and 8 with the support member 11, such as by nuts adapted to move the washers 26 and 27 into engagement with the rails 7 and 8 and thereby move the rails 7 and 8 into engagement with the support 11.

In the illustrated structure, the fastening members 24 and 25 are arranged on opposite sides of the support member 11 and are movable along the rails 7 and 8 into engagement with respective opposite sides or surfaces of the support member 11. The fastening members 24 and 25 each may be positioned relative to a respective one of the bolts 21 extending through the space between the side-by-side members 19 and 20 in a manner to bear against at least one of the bolts 21 in each of the rails 7 and 8 to thereby prevent removal of the spray support frame 1 from the support member 11, as best seen in FIGS. 2 and 3. The arm 12 is an elongated member having a plurality of spaced apertures 28 therein intermediate the ends of the arm 12. The arm 12 is pivotally mounted on one of the rails, for example the rail 7 and the arm is maintained in a selected position to position the spray nozzle 6 at a selected position relative to the ground surface 14 over which the mobile frame 3 is moved.

The arm 12 has generally flat opposite sides and in the illustrated structure, the arm 12 is positioned between the side-by-side members 19 and 20 of each of the rails 7 and 8. The arm 12 has the spray nozzle 6 mounted on one end thereof. The arm 12 is mounted for swinging movement to move the spray nozzle 6 to a selected position relative to the ground surface 14.

In the illustrated structure, the arm 12 is positioned between the side-by-side members 19 and 20 of each of the rails 7 and 8 and a suitable fastening member, such as a bolt 29 similar to the bolts 21, extends through the side-by-side members 19 and 20 of the rail 7 and through a selected one of the apertures 28 in the arm 12. The bolt 29 includes a head 30 engageable with the exterior of one of the members of the rail 7 and a nut 31 engageable with the exterior of the other of the side-by-side members of the rail 7. The end of the arm 12 opposite the spray nozzle 6 is positioned between the side-by-side members 19 and 20 of the other rail 8 and the arm is thereby maintained in a selected position by being in frictional engagement with facing surfaces of the side-by-side members 19 and 20 of the other rail 8.

In using a spray support frame constructed as illustrated and described, the spray support frame 1 is moved longitudinally along the support member 11 to a selected position and the spaced fastening members 24 and 25 are tightened to effect clamping engagement of facing edges of the rails 7 and 8 with the opposite surfaces or sides 9 and 10 respectively of the support member 11. The fastening members 24 and 25 may be adjusted along the rails 7 and 8 as desired to engage opposite edges of the support member 11 before tightening. The arm 12 is then pivotted to move the spray nozzle 6 to a desired position relative to the ground surface 14 to thereby spray a selected liquid over a desired area of the ground surface 14. The bolts 21 may be tightened to effect clamping engagement of the side-by-side members 19 and 20 with the fastening members 24 and 25 and with the arm 12 to maintain same in an adjusted position. If desired, the bolts 21 may be tightened to an extent which permits manually moving the arm 12 to raise or lower the spray nozzle 6 as desired and yet frictionally resist additional movement of the portion of the arm 12 between the side-by-side members 19 and 20 of the other rail 8.

The support member 11 is positioned on a leading or forward portion of the mobile frame 3 when it is desired to spray in front of earth turning implements, such as discs, and the support member 11 is positioned on a rear or trailing portion of the mobile frame 3 when it is desired to spray planting water, liquid fertilizer, or other spray material on the ground surface after seeds have been planted therein.

FIG. 4 illustrates typical means for positioning the spray nozzle 6 laterally of the arm 12 in the event that the spray support frame 1 cannot be positioned at the desired location along the support member 11 such as due to mounting on the support member 11 of earth working or planting devices. The hose connection 18 is mounted on the end of the arm 12 in a manner similar to that illustrated in FIGS. 1 to 3 inclusive. A coupling member 32 is mounted on the hose connection 18, as by having an internally threaded bore with one end of the coupling member 32 being mounted on the hose connection 18 and the other end adapted to receive one end of an externally threaded connection member 33 which is adapted to have the spray nozzle 6 mounted on the other end thereof.

The coupling member 32 may be any desired length as required to position the spray nozzle 6 at a desired lateral spacing from the arm 12. The coupling member 32 may be also of any desired configuration, such as straight to position the spray nozzle 6 in line with the free end of the arm 12 or curved to position the spray nozzle 6 at any desired position relative to the free end of the arm 12.

Use of a spray support frame having the means for positioning the spray nozzle 6 at a selected spacing from the arm 12 is substantially similar to use of the spray support frame 1 illustrated in FIGS. 1 to 3 inclusive except that the coupling member 32 and the connection member 33 are adjusted as desired to position the spray nozzle 6 at the desired location.

It is to be understood that while I have illustrated and described certain forms of my invention, it is not to be limited to these specific forms or arrangement of parts herein described and shown.

What I claim and desire to secure by Letters Patent is:

1. A spray support frame for use in an agricultural apparatus, said spray support frame comprising:
   a. first and second opposed rails each positioned in engagement with a support member on an agricultural apparatus;
   b. means for urging each of said first and second rails into and maintaining same in clamped engagement with the support member;
   c. an arm pivotally mounted on one of said first and second rails;
   d. spray means supported on said arm;
   e. means communicating said spray means with a source of spray material; and
   f. means on the other of said first and second rails for frictionally engaging said arm to retain said arm and said spray means thereon in a selected position relative to a ground surface.

2. A spray support frame as set forth in claim 1 wherein:
   a. said first and second rails are each spaced elongated side-by-side members;
   b. said arm has opposite sides thereof positioned between said side-by-side members of the other of said first and second rails; and
   c. said means for frictionally engaging said arm to retain said arm and said spray means thereon in a selected position comprises means for effecting and maintaining clamping engagement of the side-by-side members of the other of said first and second rails with said arm thereby retaining same and said spray means thereon in a selected position.

3. A spray support frame as set forth in claim 2 wherein:
   A. said arm is an elongated member having a free end thereof adapted to receive and support said spray means thereon; and
   b. said spray means includes a spray nozzle and means for positioning and supporting the spray nozzle in a selected lateral spacing from said arm.

4. A spray support frame as set forth in claim 1 wherein:
   a. said first and second rails are each spaced elongated side-by-side members, said side-by-side members having facing generally flat surfaces;
   b. said arm has generally flat opposite sides;
   c. said arm is positioned between the flat surfaces of the side-by-side members of said first and second rails; and
   d. said means for frictionally engaging said arm to retain said arm and said spray means thereon in a selected position comprises means for effecting and maintaining clamping engagement of the side-by-side members of the other of said rails with the flat opposite sides of said arm thereby retaining same and said spray means thereon in a selected position relative to the ground surface.

5. A spray support frame as set forth in claim 1 wherein:
   a. said spray support frame includes spaced means extending between said opposed rails and engageable with said support member for positioning and retaining said spray support frame in a selected position on said support member;
   b. said arm is an elongated member having a free end thereof adapted to receive and support said spray means thereon; and
   c. said spray means includes a spray nozzle and means for supporting and positioning said spray nozzle in spaced relation with said arm.

6. A spray support for use in an agricultural apparatus comprising:
   a. at least one spray support frame adjustably mounted on a support member on an agricultural apparatus and having a spray nozzle mounted thereon, said spray support frame including:
      1. first and second opposed rails each positioned in engagement with a respective one of the first and second surfaces of said support member, said rails each being spaced side-by-side members having facing generally flat surfaces;
      2. first and second elongated members positioned between said side-by-side members of each of said rails and each being movable along said rails and engageable with a respective one of the opposite sides of said support member, said first and second elongated members being adapted to move said first and second rails into and maintain same in clamped engagement with said support member to effect support of said spray support frame thereon;
      3. an arm having an intermediate portion thereof pivotally mounted on one of said rails, said arm having generally flat opposite sides, said arm having a portion thereof positioned between the side-by-side members of the other of said rails, said arm having said spray nozzle mounted on one end thereof, said arm being swingable to move said spray nozzle to a selected position relative to a ground surface; and
      4. means engaging each of the side-by-side members of each of said rails to draw said respective side-by-side members toward each other and into clamping engagement with said first and second elongated members and to draw the side-by-side members of the other of said rails toward each other and into frictional engagement with respective flat sides of the portion of said arm therebetween to thereby retain said arm and said spray nozzle thereon in a selected position relative to the ground surface.

* * * * *